US011425679B2

(12) United States Patent
Kusumoto et al.

(10) Patent No.: US 11,425,679 B2
(45) Date of Patent: Aug. 23, 2022

(54) TERMINAL POSITION ESTIMATION SYSTEM, TERMINAL POSITION ESTIMATION APPARATUS, TERMINAL POSITION ESTIMATION METHOD, AND COMPUTER-READABLE NON-TRANSITORY TANGIBLE STORAGE MEDIUM STORING CONTROL PROGRAM

(71) Applicant: DENSO CORPORATION, Kariya (JP)

(72) Inventors: Tetsuya Kusumoto, Kariya (JP); Takashi Saitou, Kariya (JP); Takashi Shinoda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/115,532

(22) Filed: Dec. 8, 2020

(65) Prior Publication Data

US 2021/0092704 A1    Mar. 25, 2021

Related U.S. Application Data

(63) Continuation of application No. PCT/JP2019/016250, filed on Apr. 16, 2019.

(30) Foreign Application Priority Data

Jun. 14, 2018   (JP) .............................. JP2018-113737

(51) Int. Cl.
*H04W 64/00* (2009.01)
*H04B 17/318* (2015.01)
(Continued)

(52) U.S. Cl.
CPC ......... *H04W 64/006* (2013.01); *G01S 5/0036* (2013.01); *G01S 11/06* (2013.01); *H04B 17/318* (2015.01); *H04W 24/10* (2013.01)

(58) Field of Classification Search
CPC ... H04W 64/006; H04W 24/10; G01S 5/0036; G01S 11/06; G01S 1/02; G01S 5/0205;
(Continued)

(56) References Cited

U.S. PATENT DOCUMENTS 6,188,913 B1 *    2/2001  Fukagawa .......... H01Q 3/2605
                                                     455/562.1
2016/0345286 A1 *  11/2016  Jamieson ................ G01S 3/023

FOREIGN PATENT DOCUMENTS

JP        H08140954 A     6/1996
JP        2007124406 A    5/2007
(Continued)

*Primary Examiner* — Kabir A Timory
(74) *Attorney, Agent, or Firm* — Harness, Dickey & Pierce, P.L.C.

(57) ABSTRACT

In a terminal position estimation system, a terminal position estimation apparatus, or a terminal position estimation method, an electric wave is received by a reception antenna of a communication terminal and is transmitted from multiple transmission antennas. A communication terminal position is estimated based on a magnetic field strength of the electric wave. When the communication terminal position is estimated, a position satisfying an approximate expression is estimated as the communication terminal position. The approximate expression shows a magnetic field strength distribution and is expressed by two variables of a distance from the multiple transmission antennas to the communication terminal and an angle between an axial direction of the multiple transmission antennas and a direction in which the communication terminal is positioned.

11 Claims, 11 Drawing Sheets

(51) Int. Cl.
*G01S 5/00* (2006.01)
*G01S 11/06* (2006.01)
*H04W 24/10* (2009.01)

(58) Field of Classification Search
CPC ........ G01S 1/042; G01S 5/02528; G01S 5/14; H04B 17/318; E05B 49/00; B60R 25/24
See application file for complete search history.

(56) References Cited

FOREIGN PATENT DOCUMENTS

| | | | |
|---|---|---|---|
| JP | 2011112424 | A | 6/2011 |
| JP | 2012172334 | A | 9/2012 |
| JP | 5736693 | B2 | 6/2015 |
| JP | 2017032486 | A | 2/2017 |
| JP | 6104344 | B1 | 3/2017 |
| JP | 2017044563 | A | 3/2017 |

\* cited by examiner

TERMINAL POSITION ESTIMATION SYSTEM, TERMINAL POSITION ESTIMATION APPARATUS, TERMINAL POSITION ESTIMATION METHOD, AND COMPUTER-READABLE NON-TRANSITORY TANGIBLE STORAGE MEDIUM STORING CONTROL PROGRAM

CROSS REFERENCE TO RELATED APPLICATIONS

The present application is a continuation application of International Patent Application No. PCT/JP2019/016250 filed on Apr. 16, 2019, which designated the U.S. and claims the benefit of priority from Japanese Patent Application No. 2018-113737 filed on Jun. 14, 2018. The entire disclosures of all of the above applications are incorporated herein by reference.

TECHNICAL FIELD

The present disclosure relates to a terminal position estimation system, a terminal position estimation apparatus, a terminal position estimation method, and a control program that estimate a position by using an electric wave.

BACKGROUND

A technique for estimating a position by using an electric wave has been known. For example, in a technique of a comparative example, by using a property that an intensity of LF (that is, long wave) is inversely proportion to the cube of a distance and decrease, a position of an electronic key is estimated based on each strength that is transmitted from two LF transmission antennas mounted on a vehicle and is received by a LF reception antenna of the electronic key. In the comparative example, each of the LF transmission antennas determines to which intensity range the intensity of the transmitted LF belongs among multiple intensity ranges shown by concentric circles existing among the three types of reference intensities. The position of the electronic key is estimated based on the combination of the strength of the transmitted LF and the belonging strength range for each of the LF transmission antennas.

SUMMARY

In a terminal position estimation system, a terminal position estimation apparatus, or a terminal position estimation method, an electric wave may be received by a reception antenna of a communication terminal and be transmitted from multiple transmission antennas. A communication terminal position may be estimated based on a magnetic field strength of the electric wave. When the communication terminal position is estimated, a position satisfying an approximate expression may be estimated as the communication terminal position. The approximate expression may show a magnetic field strength distribution and be expressed by two variables of a distance from the multiple transmission antennas to the communication terminal and an angle between an axial direction of the multiple transmission antennas and a direction in which the communication terminal is positioned.

BRIEF DESCRIPTION OF DRAWINGS

The above and other features and advantages of the present disclosure will be more clearly understood from the following detailed description with reference to the accompanying drawings. In the accompanying drawings.

DETAILED DESCRIPTION

Figure 1:
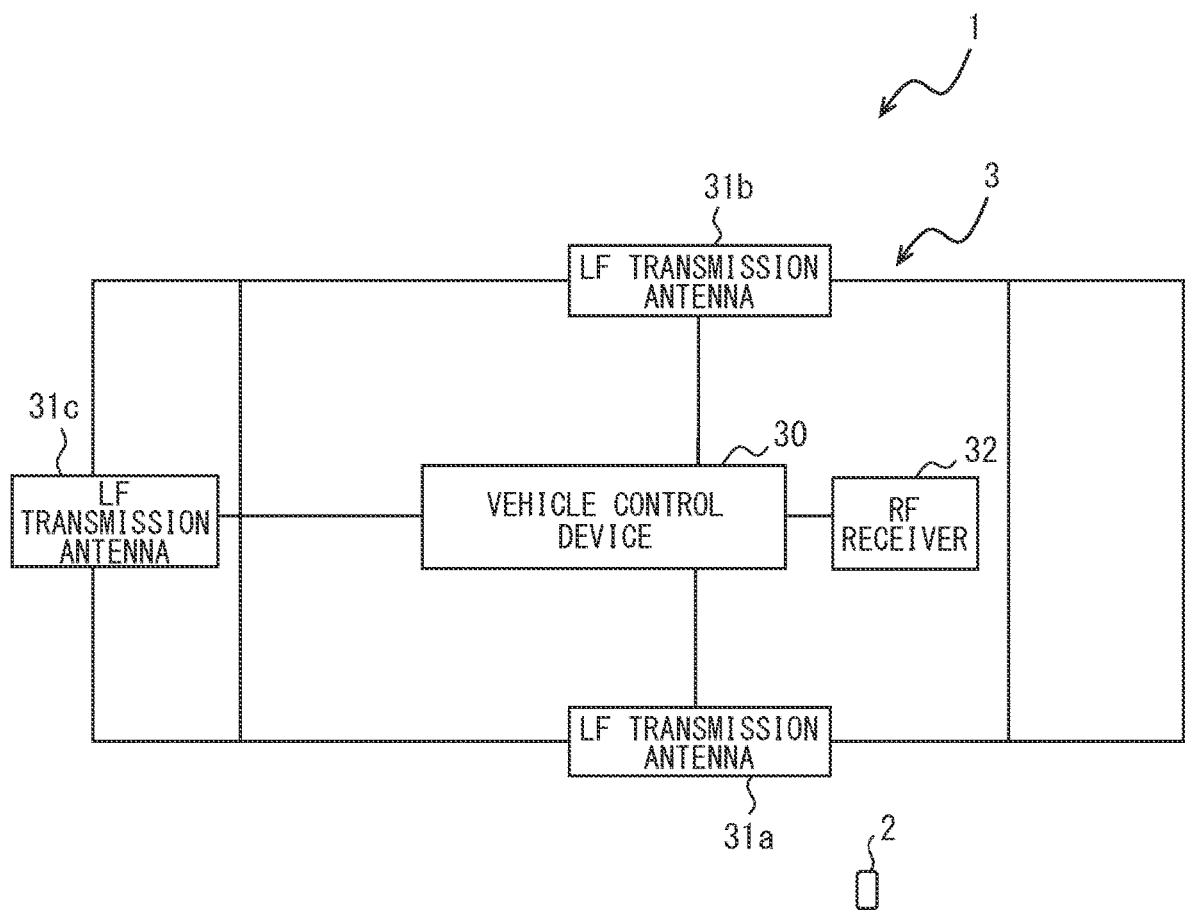
FIG. 1 is one example of a schematic configuration of a terminal position estimation system and a vehicle unit.

In the comparative example, on assumption that a magnetic field strength has an ideal concentric circular distribution that is inversely proportional to the cube of the distance, the position of the electronic key is estimated. However, depending on a directivity of the LF transmission antenna, the magnetic field strength distribution is not concentric but elliptic. Therefore, in the technique of the comparative example, an accuracy of the position estimation of the electronic key may be reduced.

One example of the present disclosure provides a terminal position estimation system, a terminal position estimation apparatus, a terminal position estimation method, and a control program capable of more improving an accuracy of a position of a communication terminal that performs estimation by using an electric wave received by the communication terminal from multiple transmission antennas.

According to one example embodiment, the terminal position estimation system includes multiple predetermined transmission antennas, a reception antenna that receives an electric wave transmitted from the transmission antennas, a strength determination portion that determines a magnetic field strength of the electric wave received by the reception antenna, and a terminal position estimation portion that estimates a communication terminal position based on the magnetic field strength of the electric wave transmitted from the multiple transmission antennas, the magnetic field strength being determined by the strength determination portion. When estimating the communication terminal position based on the magnetic field strength of the electric wave transmitted from the multiple transmission antennas, the terminal position estimation portion estimates, as the communication terminal position, a position satisfying an approximate expression for each of the multiple transmission antennas within a predetermined range. The approximate expression shows a magnetic field strength distribution for each of the multiple transmission antennas and is expressed by two variables of a distance from the multiple transmission antennas to the communication terminal and an angle between an axial direction of the multiple transmission antennas and a direction in which the communication terminal is positioned.

The terminal position estimation apparatus includes a strength acquisition portion that acquires the magnetic field strength of the electric wave that is received by the reception antenna of the communication terminal and transmitted from the multiple predetermined transmission antennas and a terminal position estimation portion that estimates the communication terminal position based on the magnetic field strength of the electric wave transmitted from the multiple transmission antennas, the magnetic field strength being acquired by the strength acquisition portion. When estimating the communication terminal position based on the magnetic field strength of the electric wave transmitted from the multiple transmission antennas, the terminal position estimation portion estimates, as the communication terminal position, a position satisfying an approximate expression for each of the multiple transmission antennas within a predetermined range. The approximate expression shows a magnetic field strength distribution for each of the multiple transmission antennas and is expressed by two variables of a distance from the multiple transmission antennas to the communication terminal and an angle between an axial direction of the multiple transmission antennas and a direction in which the communication terminal is positioned.

In a terminal position estimation method, an electric wave transmitted from multiple predetermined transmission antennas is received by a reception antenna of a communication terminal. A magnetic field strength of the electric wave received by the reception antenna is determined. When a communication terminal position is estimated based on the magnetic field strength for determination of the electric wave received by the reception antenna, a position satisfying an approximate expression for each of the multiple antennas within a predetermined range is estimated as the communication terminal position. The approximate expression shows a magnetic field strength distribution for each of the multiple transmission antennas and is expressed by two variables of a distance from the multiple transmission antennas to the communication terminal and an angle between an axial direction of the multiple transmission antennas and a direction in which the communication terminal is positioned.

A control program causes a computer to function as a strength acquisition portion that acquires a magnetic field strength of an electric wave that is received by a reception antenna of a communication terminal and is transmitted from multiple transmission antennas that are predetermined and a terminal position estimation portion that estimates, as a communication terminal position, a position satisfying an approximate expression for each of the multiple transmission antennas within a predetermined range when estimating the communication terminal position based on the magnetic field strength of the electric wave transmitted from the multiple transmission antennas, the approximate expression showing a magnetic field strength distribution for each of the multiple transmission antennas and being expressed by two variables of a distance from the multiple transmission antennas to the communication terminal and an angle between an axial direction of the multiple transmission antennas and a direction in which the communication terminal is positioned.

According to the present disclosure, when estimating the communication terminal position based on the magnetic field strength of the electric wave transmitted from the multiple predetermined transmission antennas, the terminal position estimation portion estimates, as the communication terminal position, a position satisfying an approximate expression for each of the multiple transmission antennas within a predetermined range. The approximate expression shows a magnetic field strength distribution for each of the multiple transmission antennas and is expressed by two variables of a distance from the multiple transmission antennas to the communication terminal and an angle between an axial direction of the multiple transmission antennas and a direction in which the communication terminal is positioned. Even when the magnetic field strength distribution of the electric wave transmitted from the transmission antenna is not concentric but elliptical due to the directivity of the transmission antenna, it may be possible to use the approximate expression of two variables of the distance from the transmission antenna to the communication terminal position and the angle between the axial direction of the transmission antenna and the direction in which the communication terminal is positioned. Accordingly, it may be possible to more accurately estimate the communication terminal position by estimating the position satisfying the approximate expression for each of the multiple predetermined transmission antennas within the predetermined range, even when the magnetic field strength distribution of the electric wave transmitted from the transmission antenna is not concentric but elliptical. As the result, it may be possible to more improve the accuracy of the position of the communication terminal estimated based on the electric wave received by the communication terminal from the multiple transmission antennas.

First Embodiment (Configuration of Terminal Position Estimation System)

As shown in FIG. 1, a terminal position estimation system 1 includes a communication terminal 2 and a vehicle unit 3 used in a vehicle. Each of the communication terminal 2 and the vehicle unit 3 can transmit and receive a signal via an electric wave by performing wireless communication. When the communication terminal 2 is located within a communication range of the vehicle unit 3 and the vehicle unit 3 is located within a communicable range of the communication terminal 2, a first one of the communication terminal 2 and the vehicle unit 3 transmits a signal via wireless communication and a second one thereof receives the signal.

(Configuration of Communication Terminal)

Figure 2:
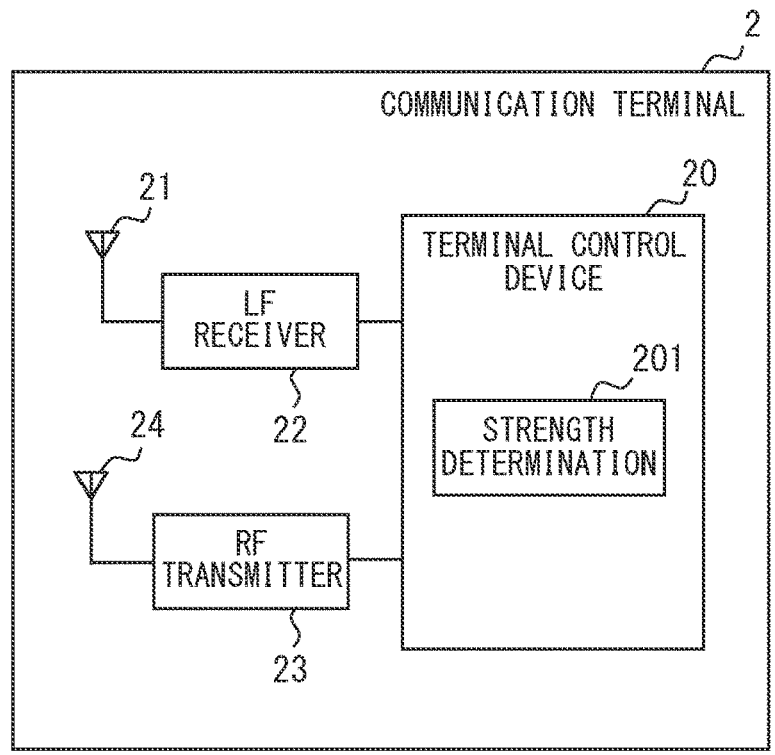
FIG. 2 is one example of a schematic configuration of a communication terminal.

The communication terminal 2 is, for example, carried by a user. A condition "carried by a user" does not limitedly indicate a state of being carried by the user but also includes a state of not being carried by the user but being left behind. Here, the communication terminal 2 will be described with reference to FIG. 2. As shown in FIG. 2, the communication terminal 2 includes a terminal control device 20, a LF reception antenna 21, a LF reception portion 22, a RF transmission portion 23, and a RF transmission antenna 24.

The LF reception antenna 21 receives a signal (LF signal) transmitted on the electric wave of a LF (Low frequency) band from a LF transmission antenna 31 described later of the vehicle unit 3. This LF reception antenna 21 may correspond to a reception antenna. The LF band is a low frequency band, for example, from 30 kHz to 300 kHz. Hereinafter, the electric wave in the LF band is simply referred to as LF. The LF reception antenna 21 is a magnetic field type antenna, and may use, for example, a loop antenna, a bar antenna, or the like.

The LF reception portion 22 generates a reception signal while electrically processing the LF signal received by the LF reception antenna 21. The LF reception portion 22 outputs the generated reception signal to the terminal control device 20. The RF transmission portion 23 generates a response signal to the LF signal received by the LF reception antenna 21 while electrically processing an original signal input from the terminal control device 20. The RF transmission portion 23 transmits this response signal from the RF transmission antenna 24. The RF transmission antenna 24 transmits the response signal on the electric wave of an RF (Radio frequency) band. The RF band is a high frequency band, for example, from 300 Hz to 3 THz.

The terminal control device 20 is an IC, a computer, or the like, and includes a strength determination portion 201. The strength determination portion 201 determines a magnetic field strength (reception magnetic field strength) of the LF received by the LF reception antenna 21. For example, the magnetic field strength is magnetic flux density. The communication terminal 2 includes, for example, a sensor such as a hall element for measuring the magnetic field strength, and thereby the determination of the reception magnetic field strength may be performed based on the LF magnetic field strength measured by this sensor. In addition, the LF reception portion 22 may include a current detector that detects a current flowing through the LF reception antenna 21, and the LF magnetic field strength is calculated based on the current detected by this current detector. Thereby, the strength determination portion 201 may determine the reception magnetic field strength. In one example, when each of the LF reception antennas 21 is a multi-axis coil antenna in which coils are arranged so as to be orthogonal to each other, for example, the current amount and the current direction of each axis of the coil antenna are detected by the current detector and a magnetic field of each axis is specified based on the current amount and the current direction. The magnetic fields of the axes are combined and a magnetic field vector is calculated. Thereby, the reception magnetic field strength may be determined When generating the original signal of the response signal in accordance with a reception signal input from the LF reception portion 22, the terminal control device 20 generates the original signal of the response signal including the reception magnetic field strength determined by the strength determination portion 201, and outputs this original signal to the RF transmission portion 23. The RF transmission portion 23 transmits the response signal including the reception magnetic field strength. When the multiple LF transmission antennas 31 described later sequentially transmit the LF signal, the response signal is returned at each timing when the LF signal is transmitted. Therefore, the response signal including the reception magnetic field strength of each LF transmission antenna 31 is returned for each LF transmission antenna 31.

(Configuration of Vehicle Unit)

A schematic configuration of the vehicle unit 3 will be described with reference to FIG. 1. The vehicle unit 3 as shown in FIG. 1 includes a vehicle control device 30, LF transmission antennas 31a to 31c, and a RF receiver 32.

The LF transmission antennas 31a to 31c are transmission antennas that transmit the signal on the LF. When description is provided without distinguishing each of the LF transmission antennas 31a to 31c, the LF transmission antennas 31a to 31c are referred to as the LF transmission antenna 31. The LF transmission antenna 31 is a magnetic field type antenna using an antenna coil, and may use, for example, a uniaxial loop antenna, a bar antenna, or the like.

Figure 3:
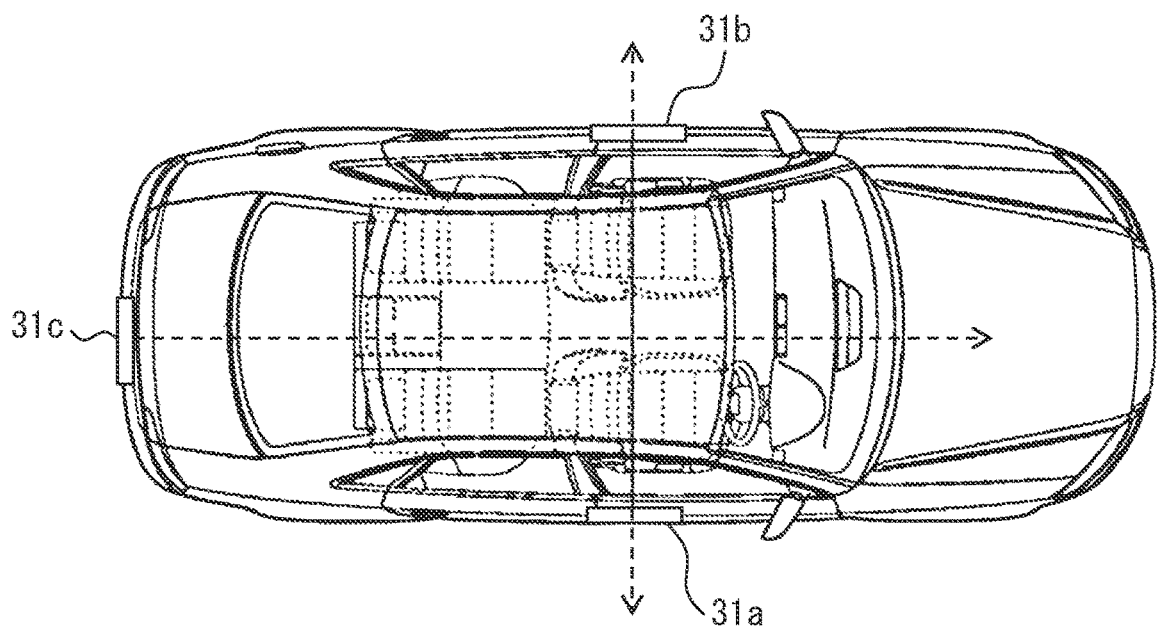
FIG. 3 is a view illustrating one example of an arrangement of LF transmission antennas.

One example of an arrangement of the LF transmission antennas 31a to 31c will be described with reference to FIG. 3. As shown in FIG. 3, the LF transmission antenna 31a is placed at a right part of a vehicle body of the vehicle. In one example, the axis may be built in an outer door handle of a driver seat of the vehicle so as to extend in the front rear direction of the vehicle. The LF transmission antenna 31b is placed at a left part of the vehicle body of the vehicle. In one example, the axis may be built in an outer door handle of a front passenger seat of the vehicle so as to extend in the front rear direction of the vehicle. The LF transmission antenna 31c is placed at a rear part of the vehicle body of the vehicle. In one example, the axis may be built in a rear bumper so as to extend in the left right direction of the vehicle.

The LF transmission antennas 31a to 31c may be arranged so that the axes extending in a normal direction of an antenna opening surface are aligned in the same direction. However, magnetic field contour lines in a short side direction of the elliptical magnetic field strength distribution are less likely to intersect with each other, the estimation accuracy of the terminal position described later is likely to be deteriorated. Therefore, it is preferable to change the direction of the axis extending in the normal direction of the antenna opening surface of at least one LF transmission antenna 31 with respect to the other transmission antennas 31. For example, it is preferable that the axes extending in the normal direction of the antenna opening surface of the LF transmission antenna 31a, the LF transmission antenna 31b, and the LF transmission antenna 31c intersect with each other, as shown by a dashed arrow of FIG. 3. In other words, it is preferable that the LF transmission antennas 31 are arranged so that a mounting direction of one LF transmission antenna 31 intersects with a mounting direction of another LF transmission antenna 31. The mounting direction may be also referred to as an axis direction of the LF transmission antenna 31.

FIG. 3 shows the example in which the directions of the axes extending in the normal direction of the antenna opening surface, that is, the mounting directions of the LF transmission antenna 31a and the LF transmission antenna 31c intersect with each other, and the mounting directions of the LF transmission antenna 31b and the LF transmission antenna 31c intersect with each other. However, if the mounting directions intersect with each other, it is not limited to the configuration in which the mounting directions intersect vertically.

The RF receiver 32 receives the response signal that is transmitted from the communication terminal 2 on the electric wave of the RF band and includes the reception magnetic field strength. The vehicle control device 30 includes a processor, a memory, an I/O, and a bus connecting these, and executes various processes such as a program related to the position estimation of the communication terminal 2 by executing a control program stored in the memory. Execution of this control program by the processor corresponds to execution of a method corresponding to the control program. This method corresponds to a terminal position estimation method. The memory is a non-transitory tangible storage medium that non-temporarily stores a computer readable program and data. The non-transitory tangible storage medium is realized by a semiconductor memory, a magnetic disc, or the like.

(Configuration of Vehicle Control Device)

Figure 4:
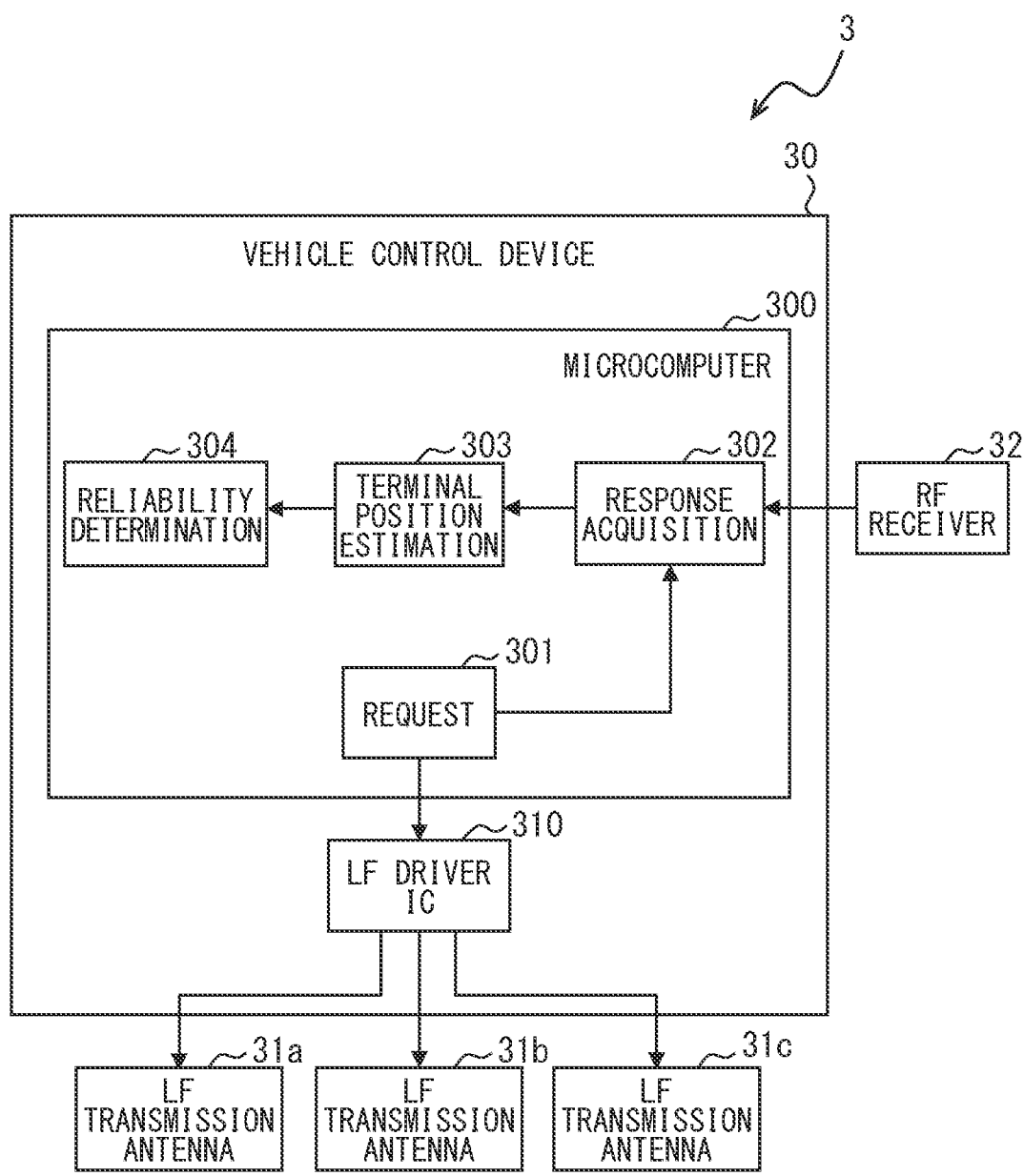
FIG. 4 is a diagram showing one example of a schematic configuration of a vehicle control device.

One example of a schematic configuration of the vehicle control device 30 will be described with reference to FIG. 4. As shown in FIG. 4, the vehicle control device 30 includes a microcomputer 300 and a LF driver IC 310. The vehicle control device 30 is connected to the LF transmission antennas 31a to 31c, the RF receiver 32, or the like.

As shown in FIG. 4, the microcomputer 300 includes, as function blocks, a request portion 301, a response acquisition portion 302, a terminal position estimation portion 303, and a reliability determination portion 304. This microcomputer 300 corresponds to a terminal position estimation apparatus. The request portion 301 requests the LF driver IC 310 to sequentially transmit the LF signal from the LF transmission antennas 31a to 31c. In one example, the request portion 301 may request the transmission of the LF signal when the own vehicle is parked and a door handle SW placed at the outer door handle of the door of the vehicle is operated as a trigger. The parking of the own vehicle may be determined by the microcomputer 300 based on a vehicle speed detected by a vehicle speed sensor, a shift position detected by a shift position sensor, a switch signal of a parking brake, or the like. The microcomputer 300 may determine that the door handle SW is operated based on the signal of the door handle SW. In another example, the request portion 301 may request the transmission of the LF signal when the own vehicle is parked and a push SW for requesting a start of a traveling drive source of the vehicle is operated as a trigger. The microcomputer 300 may determine that the push SW is operated based on the signal of the push SW.

The LF driver IC 310 is an IC that transmits the LF signal from the LF transmission antennas 31a to 31c. In accordance with the request from the request portion 301, the LF driver IC 310 causes the LF transmission antennas 31a to 31c to sequentially transmit the LF signal. The communication terminal 2 returns the response signal to the LF signal sequentially transmitted from the LF transmission antennas 31a to 31c for each LF transmission antenna 31. The response signal includes the reception magnetic field strength for each LF transmission antenna. The vehicle control device 30 distinguishes the response signal for each LF transmission antenna 31 depending on which LF transmission antenna 31 among the LF transmission antennas 31a to 31c and the transmission timing of the LF transmission antenna 31.

The response acquisition portion 302 acquires the response signal that is received by the RF receiver 32 from the communication terminal 2 and includes the reception magnetic field strength. This response acquisition portion 302 corresponds to a strength acquisition portion. The response acquisition portion 302 outputs the reception magnetic field strength of the response signal for each LF transmission antenna 31 to the terminal position estimation portion 303.

Although details are omitted in the present embodiment, when the response signal includes an authentication code, authentication is performed by using this code. Depending on the position of the communication terminal 2 estimated by the terminal position estimation portion 303 and whether the authentication is established, a door may be locked or unlocked, the start of the traveling drive source of the vehicle may be permitted, or the like.

The terminal position estimation portion 303 estimates the position of the communication terminal 2 by using the reception magnetic field strength acquired by the response acquisition portion 302 for each LF transmission antenna 31. The terminal position estimation portion 303 estimates the position of the communication terminal 2 by using the approximate expression of the magnetic field strength distribution in order to more accurately estimate the position of the communication terminal 2 even when the magnetic field strength distribution of the LF transmitted from the LF transmission antenna 31 is not concentric.

Figure 5:
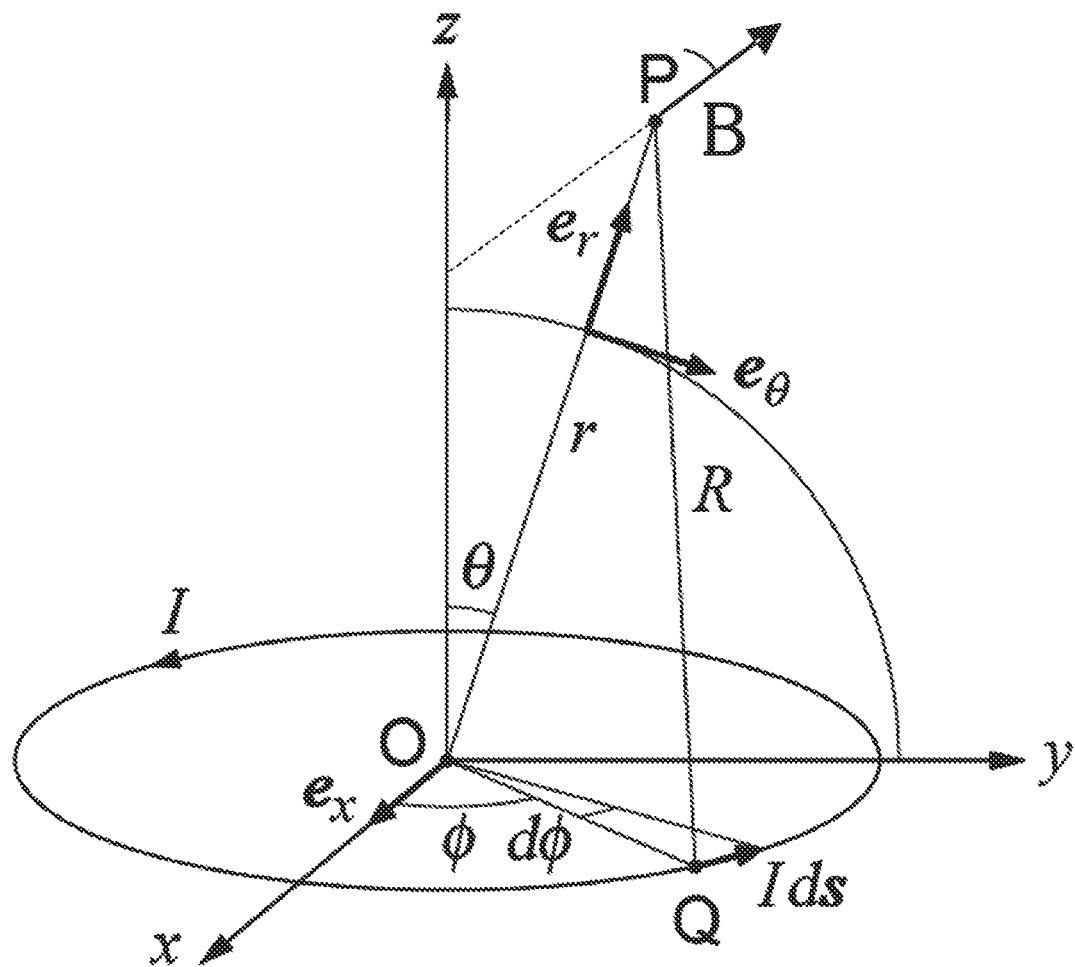
FIG. 5 is a view showing one example of an approximate expression that is used by a terminal position estimation portion fora position equation of the communication terminal.

One example of the approximate expression used for the position estimation of the communication terminal 2 by the terminal position estimation portion 303 will be described with reference to FIG. 5. Here, an example of a case where the LF transmission antenna 31 is a one-turn loop antenna and the magnetic field strength field is formulated will be described. In the example of FIG. 5, a radius of the LF transmission antenna 31 is a, a current flowing through the LF transmission antenna 31 is I, a distance from a loop center O of the LF transmission antenna 31 to a position P of the communication terminal 2 is r, and an angle between the position P and an axis in the normal direction of the antenna opening surface is θ. In the case of the example of FIG. 5, a magnetic field strength B at the position P can be expressed by the following equation 1 according to the Biot-Savart law.

$$B = \frac{\mu_0 I a^2}{2r^3} \cos\theta\, e_r + \frac{\mu_0 I a^2}{4r^3} \sin\theta\, e_\theta \qquad \text{[Equation 1]}$$

By performing approximation so that the a becomes much smaller than the r in the process of line integration, the magnetic field strength B at the position P can be expressed by an approximate expression of the following equation 2. The approximate expression of the equation 2 is an equation showing the magnetic field strength distribution of the LF transmission antenna 31. The $\mu_0$ in the equation 2 is a magnetic constant. The $\mu_0$, the I, and the a are constants. Therefore, the approximate expression of the equation 2 can be expressed by two variables of the distance r from the LF transmission antenna 31 to the position of the communication terminal 2 and the angle θ between the axis direction of the LF transmission antenna 31 and the direction in which the communication terminal 2 is positioned. It has been confirmed that, even when the LF transmission antenna 31 is the loop antenna or the bar antenna, the magnetic field strength distribution of the LF transmission antenna 31 can be approximated by the approximate expression of this equation 2.

$$|B| = \frac{\mu_0 I a^2}{2r^3} \sqrt{\cos^2\theta + \frac{1}{4}\sin^2\theta} \qquad \text{[Equation 2]}$$

Figure 6:
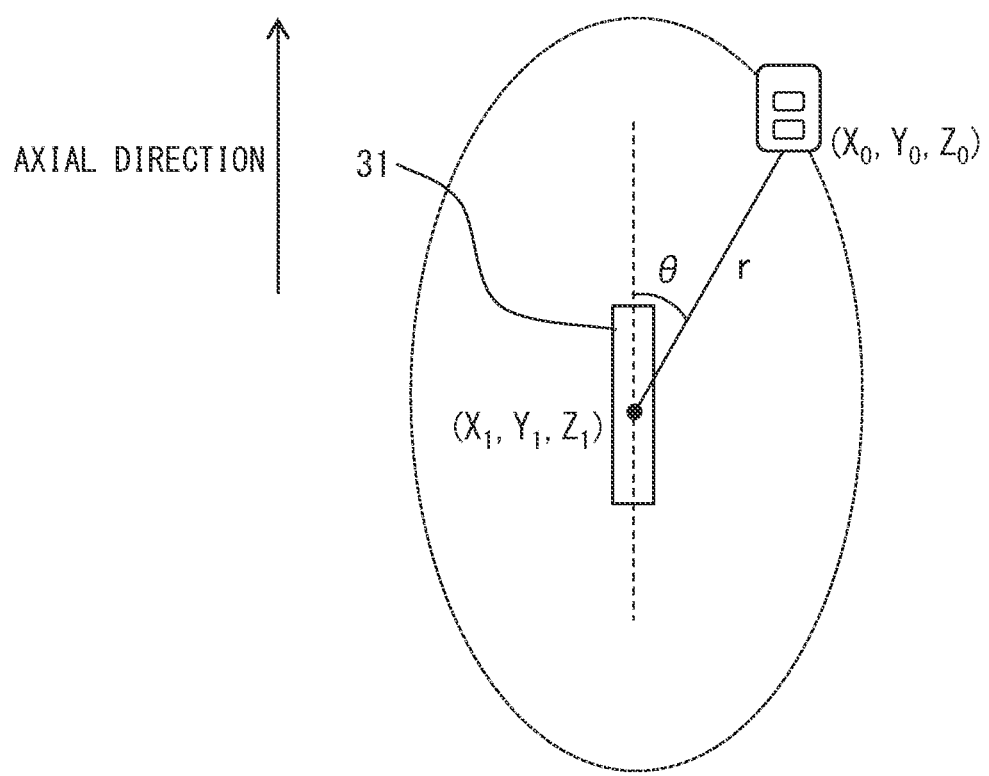
FIG. 6 is a view illustrating a specific example of the position estimation of the communication terminal based on the approximate expression.

A specific example of the position estimation of the communication terminal 2 based on the approximate expression of the equation 2 will be described. Here, as shown in FIG. 6, the position (terminal position) of the communication terminal 2 to be estimated is $(X_0, Y_0, Z_0)$, and the positions of the LF transmission antennas 31a to 31c are $(X_i, Y_i, Z_i)$. In a case of the LF transmission antenna 31a, the i is equal to 1 (i=1). In a case of the LF transmission antenna 31b, the i is equal to 2 (i=2). In a case of the LF transmission antenna 31c, the i is equal to 3 (i=3). The axis directions of the LF transmission antennas 31a and 31b are a Y direction. The axis direction of the LF transmission antenna 31c is an X direction. The approximate expression of the equation 2 can be rewritten as simultaneous equations of the following equations 3 to 5. It is a constant of $k=\mu_0 \cdot I \cdot a^2/2$. The positions of the LF transmission antennas $31a$ to $31c$ may be positions on a coordinate system in which an arbitrary point of the vehicle is a reference point. A coordinate specified by measurement or the like may be stored in a nonvolatile memory if the vehicle control device 30 in advance, and thereby used for calculation by the terminal position estimation portion 303.

$$B_1 = \frac{k}{2((X_1-X_0)^2+(Y_1-Y_0)^2+(Z_1-Z_0)^2)^{\frac{3}{2}} \sqrt{1+\frac{3(X_1-X_0)^2}{(X_1-X_0)^2+(Y_1-Y_0)^2+(Z_1-Z_0)^2}}} \quad \text{[Equation 3]}$$

$$B_2 = \frac{k}{2((X_2-X_0)^2+(Y_2-Y_0)^2+(Z_2-Z_0)^2)^{\frac{3}{2}} \sqrt{1+\frac{3(X_2-X_0)^2}{(X_2-X_0)^2+(Y_2-Y_0)^2+(Z_2-Z_0)^2}}} \quad \text{[Equation 4]}$$

$$B_3 = \frac{k}{2((X_3-X_0)^2+(Y_3-Y_0)^2+(Z_3-Z_0)^2)^{\frac{3}{2}} \sqrt{1+\frac{3(X_3-X_0)^2}{(X_3-X_0)^2+(Y_3-Y_0)^2+(Z_3-Z_0)^2}}} \quad \text{[Equation 5]}$$

The reception magnetic field strengths of the LF transmission antennas $31a$ to $31c$ are acquired by the response acquisition portion 302. When the reception magnetic field strengths of the LF transmission antennas $31a$ to $31c$ are input to the terminal position estimation portion 303, a value of the B is determined in the simultaneous equations of the equations 3 to 5. Therefore, there are three variables of $X_0$, $Y_0$, and $Z_0$. The terminal position ($X_0$, $Y_0$, $Z_0$) may be estimated by solving the simultaneous equations of the equations 3 to 5 and calculating the values of $X_0$, $Y_0$, and $Z_0$.

It is difficult to solve these simultaneous equations. When the reception magnetic field strength, the position of the LF transmission antenna 31, the constant K, or the like incudes an error It is preferable to estimate a more probable terminal position by the following method.

In the following equations 6 to 8 obtained by rewriting the equations 3 to 5, in a case of an ideal state including no error, all of $M_1$ to $M_3$ are 0. Accordingly, even in the case where the error is included, it is considered that, when a true value ($X_p$, $Y_p$, $Z_p$) of the terminal position is substituted into ($X_0$, $Y_0$, $Z_0$), the $M_1$ to $M_3$ are closest to 0.

$$M_1 = B_1 - \frac{k}{2((X_1-X_0)^2+(Y_1-Y_0)^2+(Z_1-Z_0)^2)^{\frac{3}{2}} \sqrt{1+\frac{3(X_1-X_0)^2}{(X_1-X_0)^2+(Y_1-Y_0)^2+(Z_1-Z_0)^2}}} \quad \text{[Equation 6]}$$

$$M_2 = B_2 - \frac{k}{2((X_2-X_0)^2+(Y_2-Y_0)^2+(Z_2-Z_0)^2)^{\frac{3}{2}} \sqrt{1+\frac{3(X_2-X_0)^2}{(X_2-X_0)^2+(Y_2-Y_0)^2+(Z_2-Z_0)^2}}} \quad \text{[Equation 7]}$$

-continued $$M_3 = B_3 - \frac{k}{2((X_3-X_0)^2+(Y_3-Y_0)^2+(Z_3-Z_0)^2)^{\frac{3}{2}} \sqrt{1+\frac{3(X_3-X_0)^2}{(X_3-X_0)^2+(Y_3-Y_0)^2+(Z_3-Z_0)^2}}} \quad \text{[Equation 8]}$$

The terminal position estimation portion 303 may form multiple hypotheses of terminal position candidates first, calculate residuals of the $M_1$ to $M_3$ for each of the multiple hypothesized candidate positions, and estimate, as the terminal position, the candidate position with the smallest residual. The residuals of the M1 to M3 may be calculated by the least squares method provided by the following equation 9. In other words, the squared value of an error between the magnetic field strength for each LF transmission antenna 31 and the reception magnetic field strength acquired by the response acquisition portion 302 is added, and thereby the residual may be calculated. The magnetic field strength is obtained by using the multiple hypothesized candidate positions in the approximate expression of the equation 2. The reception magnetic field strength acquired by the response acquisition portion 302 can be restated as the reception magnetic field strength determined by the strength determination portion 201. The residual may be calculated by the equations 6 to 9. The residual may be calculated by different calculation equations as long as this residual can be calculated. The forming the multiple hypotheses of the terminal position first may correspond to, for example, providing the multiple terminal position candidates.

$$\text{residual} = M_1^2 + M_2^2 + M_3^2 \quad \text{[Equation 9]}$$

When the terminal position is estimated by using the above method, it is necessary to perform calculation for each of the multiple candidate positions. Therefore, the calculation amount by the terminal position estimation portion 303 increases. For example, when trying to estimate the terminal position with a request estimation accuracy of 1 cm in a space of 5 m$^3$, the number of necessary points of the candidate positions for hypothesis is $500^3=125000000$ points, and therefore 125000000 calculations must be repeated. However, in a case where the terminal position is estimated by the above method, even when the reception magnetic field strength, the position of the LF transmission antenna 31, the constant K, or the like includes the error, it may be possible to more accurately estimate the terminal position.

It is preferable to reduce the calculation amount while estimating the more probable terminal position by the following method. In this method, a phenomenon that a residual distribution monotonically increases around the true terminal position as the center is used, the calculation amount of the terminal position estimation portion 303 is more reduced.

The terminal position estimation portion 303 forms multiple hypothetical candidate positions at intervals coarser than the request estimation accuracy of the terminal position, calculates the residuals, and selects the candidate position with the minimum residual. Next, a process of hypothesizing in which the multiple candidate positions in peripheral of the selected candidate position again at the narrowed intervals, calculating the residuals, and selecting the candidate position with the minimum residual is repeated until the interval equal to or lower than the require estimation accuracy is reached. Among the candidate positions hypothesized at the intervals lower equal to or lower than the request estimation accuracy, the candidate position with the minimum residual may be estimated as the terminal position.

When the target range for estimating the position of the communication terminal 2 is predetermined, this target range may be set as the maximum range of this target range. When the interval at which the candidate positions are hypothesized may be an equal interval. The periphery of the selected candidate position may be the vicinity of the candidate position, include the candidate position, and a range within the interval when the candidate position is hypothesized. For example, when the target range is 5 m$^3$ and the request estimation accuracy is 1 cm, the initial candidate position is hypothesized at intervals of 1 m. The candidate position with the minimum residual is included in a range at the intervals of 1 m. In the range, next candidate positions are hypothesized at further narrowed intervals of 20 cm. Thereafter, the calculation is repeated at intervals of 5 cm, 1 cm, or the like until the intervals reach intervals equal to or lower than the request estimation accuracy, and the terminal position is estimated. Thereby, it may be position to the total of calculated candidate positions to 2537 positions. This is a 99.998% reduction in the amount of calculation as compared with the total candidate positions of 125,000,000 positions when the candidate positions are hypothesized at 1 cm intervals of the request estimation accuracy in the range of 5 m$^3$.

The reliability determination portion 304 determines whether there is reliability of the terminal position sequentially estimated by the terminal position estimation portion 303. The reliability determination portion 304 determines whether there is reliability of the estimated terminal position based on whether a movement distance of the terminal position sequentially estimated by the terminal position estimation portion 303 from a terminal position estimated in the past per unit time is equal to or lower than a predetermined distance. Specifically, when the movement distance per unit time is equal to or lower than the predetermined distance, the reliability determination portion 304 determines that there is reliability. When the movement distance is higher than the predetermined distance, the reliability determination portion 304 determines that there is no reliability.

The unit time can be set arbitrarily. The distance is a distance that can be divided into a movable distance of the communication terminal 2 per unit time and a non-movable distance, and can be set arbitrarily. For example, the distance may be a distance that a person can move on foot per unit time. It may be possible to determine that there is no reliability for a clearly erroneous terminal position that would indicate an impossible movement as the movement of the communication terminal 2. The terminal position sequentially estimated by the terminal position estimation portion 303 is, for example, accumulated in a memory of the vehicle control device 30 for a certain period. The reliability determination portion 304 may determine whether the terminal position has the reliability based on the terminal position accumulated in this memory.

For example, in the vehicle control device 30, the terminal position determined by the reliability determination portion 304 to have no reliability may not be used in a downstream process. For the terminal position determined by the reliability determination portion 304 to have no reliability, the terminal position determined to have reliability may be used for the downstream process.

(Position Estimation Related Process of Vehicle Control Device)

Figure 7:
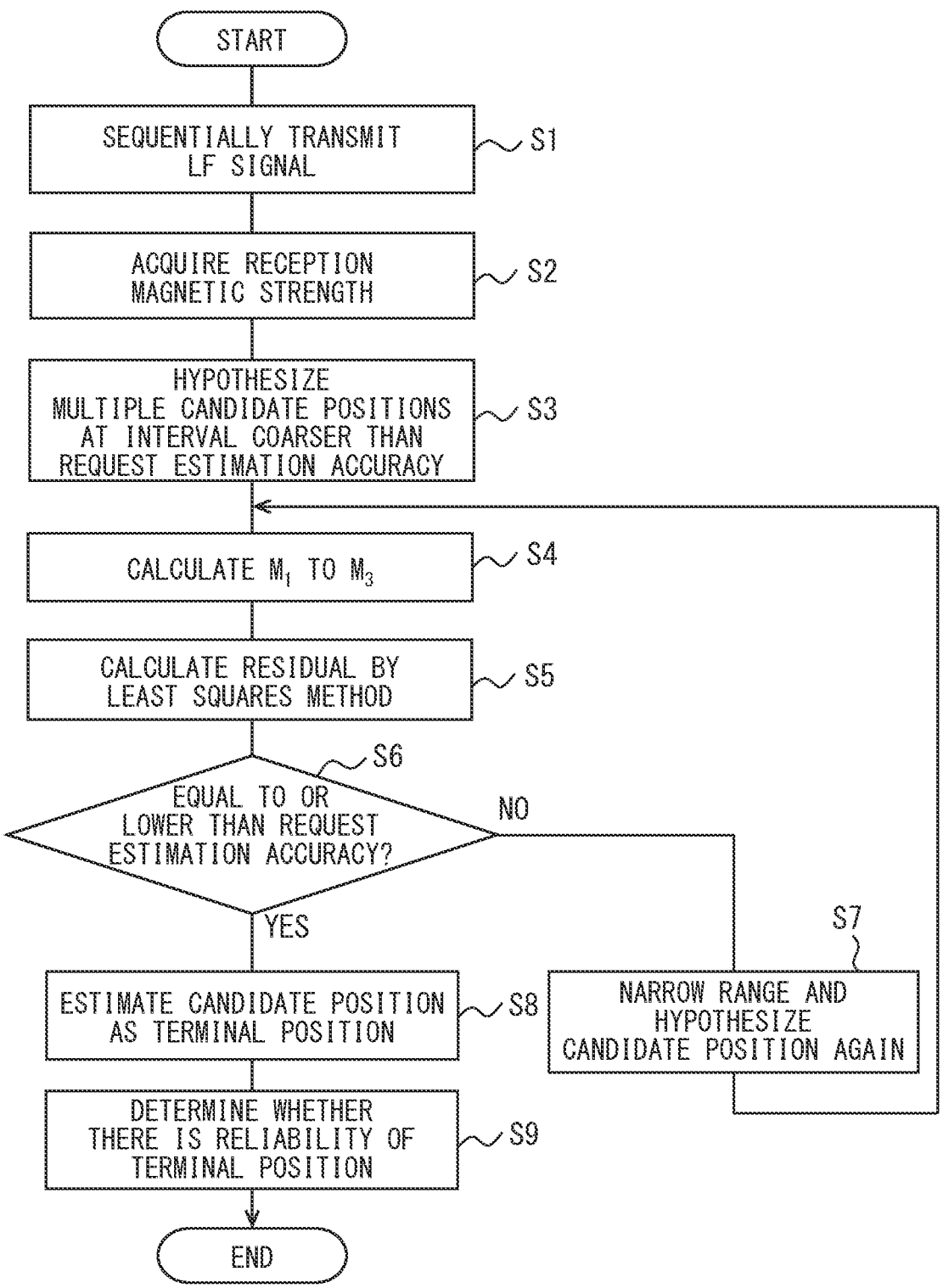
FIG. 7 is a flowchart showing one example of a flow of a position estimation related process in the vehicle control device according to a first embodiment.

A process (position estimation related process) related to estimation of the terminal position in the vehicle control device 30 will be described with reference to a flowchart of FIG. 7. The flowchart of FIG. 7 may start each time the request portion 301 requests the LF transmission antennas 31a to 31c to sequentially transmit the LF signal.

In S1, the LF driver IC 310 causes the LF transmission antennas 31a to 31c to sequentially transmit the LF signal on the LF. In the communication terminal 2 receiving the LF signal on the LF, the strength determination portion 201 determines the reception magnetic field strength of the LF received by the LF reception antenna 21, and returns the response signal including the reception magnetic field strength of each LF transmission antenna 31. In S2, the response acquisition portion 302 obtains the reception magnetic field strength included in the response signal sequentially received by the RF receiver 32 in response to the transmission of the LF signal from each LF transmission antenna 31. That is, the reception magnetic field strength for each LF transmission antenna 31 is acquired.

In S3, the terminal position estimation portion 303 hypothesizes, as the initial candidate positions, multiple candidate positions at intervals coarser than the request estimation accuracy of the terminal position. In S4, the above described $M_1$ to $M_3$ are calculated based on the approximate expression of the equation 2 and the reception magnetic field strength acquired in S2 for each LF transmission antenna 31. More specifically, the equations 6 to 9 are obtained by rewriting the approximate expression of the equation 2 for each of the LF transmission antennas 31a to 31c. The $M_1$ to $M_3$ are calculated by plugging the reception magnetic field strength acquired in S2 for each LF transmission antenna 31, the candidate position hypothesized in S3, and the positions of the LF transmission antennas 31a to 31c in the equations 6 to 9. In other words, the error between the magnetic field strength obtained by using the multiple hypothesized candidate positions for each LF transmission antenna 31 in the approximate expression of the equation 2 and the reception magnetic field strength acquired in S2 is calculated.

In S5, the terminal position estimation portion 303 calculates the residual by the least squares method based on the errors $M_1$ to $M_3$ calculated in S4 for each LF transmission antenna 31. In S6, when the interval between the hypothesized candidate positions is equal to or less than the request estimation accuracy (YES in S6), the process shifts to S8. On the other hand, when the interval is not equal to or less than the request estimation accuracy (NO in S6), the process shifts to S7.

In S7, the terminal position estimation portion 303 selects the candidate position having the minimum residual calculated in S5, further narrows the interval down to a periphery of the selected candidate position, forms the multiple hypothesis again, returns to S4, and repeats the processes. This process is repeated until the interval between the hypothesized candidate positions becomes equal to or less than the request estimation accuracy. In S8, the terminal position estimation portion 303 estimates the candidate position having the minimum residual calculated in S5 as the terminal position.

In S9, the reliability determination portion 304 determines whether the terminal position has the reliability based on whether the movement distance of the terminal position estimated in S8 from a terminal position estimated in the past per unit time is equal to or lower than a predetermined distance. The position estimation related process ends.

Even when the magnetic field strength distribution of the LF transmitted from the LF transmission antenna 31 is elliptical due to the directivity of the LF transmission antenna 31, it may be possible to use the approximate expression of two variables of the distance r from the LF transmission antenna 31 to the position of the communication terminal 2 and the angle between the axial direction of the LF transmission antenna 31 and the direction in which the communication terminal 2 is positioned. According to the configuration of the first embodiment, when the terminal position is estimated by using the reception magnetic field strength for the LF transmitted from the multiple predetermined LF transmission antennas 31 (that is, known positions), a position satisfying the approximate expression for each LF transmission antenna 31 within a range equal to or lower than the request estimation accuracy is estimated as the terminal position, the approximate expression showing the magnetic field strength distribution for each LF transmission antenna 31 by the two variables of this distance r and the angle θ. Accordingly, even when the magnetic field strength distribution of the LF transmitted from the LF transmission antenna 31 is not concentric but elliptical, it may be possible to more accurately estimate the terminal position. As the result, it may be possible to more improve the accuracy of the position of the communication terminal 2 estimated based on the electric wave received by the communication terminal 2 from the multiple transmission antennas 31. The range equal to or lower than the request estimation accuracy may be a predetermined range.

Since the residual is calculated by the least squares method, it may be possible to more accurately determine the more probable candidate position among the multiple hypothesized candidate positions while reducing the calculation load of the terminal position estimation portion 303, As the result, it may be possible to improve the estimation accuracy of the terminal position while reducing the calculation load of the terminal position estimation portion 303.

An example in which the number of LF transmission antennas 31 is three has been shown. However, it is not limited to this. For example, the number of LF transmission antennas 31 may be two, four, or more. In the first embodiment, a configuration in which a position $(X_0, Y_0, Z_0)$ on a XYZ space is estimated as the terminal position has been shown. However, it is not limited to this. For example, a position $(X_0, Y_0)$ on a XY plane may be estimated as the terminal position An example in which the magnetic flux density is used as the magnetic field strength has been shown. However, since the strength H of the magnetic field and the magnetic flux density B show a relationship of $H=(1/\mu_0) \cdot B$, based on this relationship, the approximate expression used for the estimation of the terminal position may be rewritten from the equation for the magnetic flux density B to the equation for the strength H of the magnetic field, and the strength of the magnetic field may be used as the magnetic field strength.

Second Embodiment

In the first embodiment, the residual is calculated by the least squares method. However, it is not limited to this. In a second embodiment, for example, an equation for calculating the residual is weighted in accordance with the reception magnetic field strength, the residual may be calculated. That is, the residual may be calculated by the weighted least squares method. As an example of weighting, an example shown in the following equation 10 can be given. $AB_1$ to $AB_3$ are coefficients in accordance with the reception magnetic field strength. In other words, the residual may be calculated by adding a value obtained by multiplying, by the coefficients in accordance with this reception magnetic field strength for each LF transmission antenna 31, the square value of the error between the multiple hypothesized candidate positions obtained by the approximate expression of the equation 2 for each LF transmission antenna 31 and the reception magnetic field strength acquired by the response acquisition portion 302

$$\text{residual}=AB_1M_1^2+AB_2M_2^2+AB_3M_3^2 \qquad \text{[Equation 10]}$$

The magnetic field strength distribution of the LF transmission antenna 31 is inversely proportional to the cube of the distance from the LF transmission antenna 31. Therefore, the error between the magnetic field strength obtained by using the multiple hypothesized candidate positions for each LF transmission antenna 31 in the approximate expression of the equation 2 and the reception magnetic field strength acquired by the response acquisition portion 302 becomes small when the reception magnetic field strength is strong. Accordingly, the residual is calculated by weighting with the coefficient that increases the weighting as the reception magnetic field strength increases. Thereby, it may be possible to more accurately determine the most probable candidate position among the multiple hypothesized candidate positions. As the result, it may be possible to further improve the estimation result of the terminal position while reducing the calculation load of the terminal position estimation portion 303.

Figure 8:
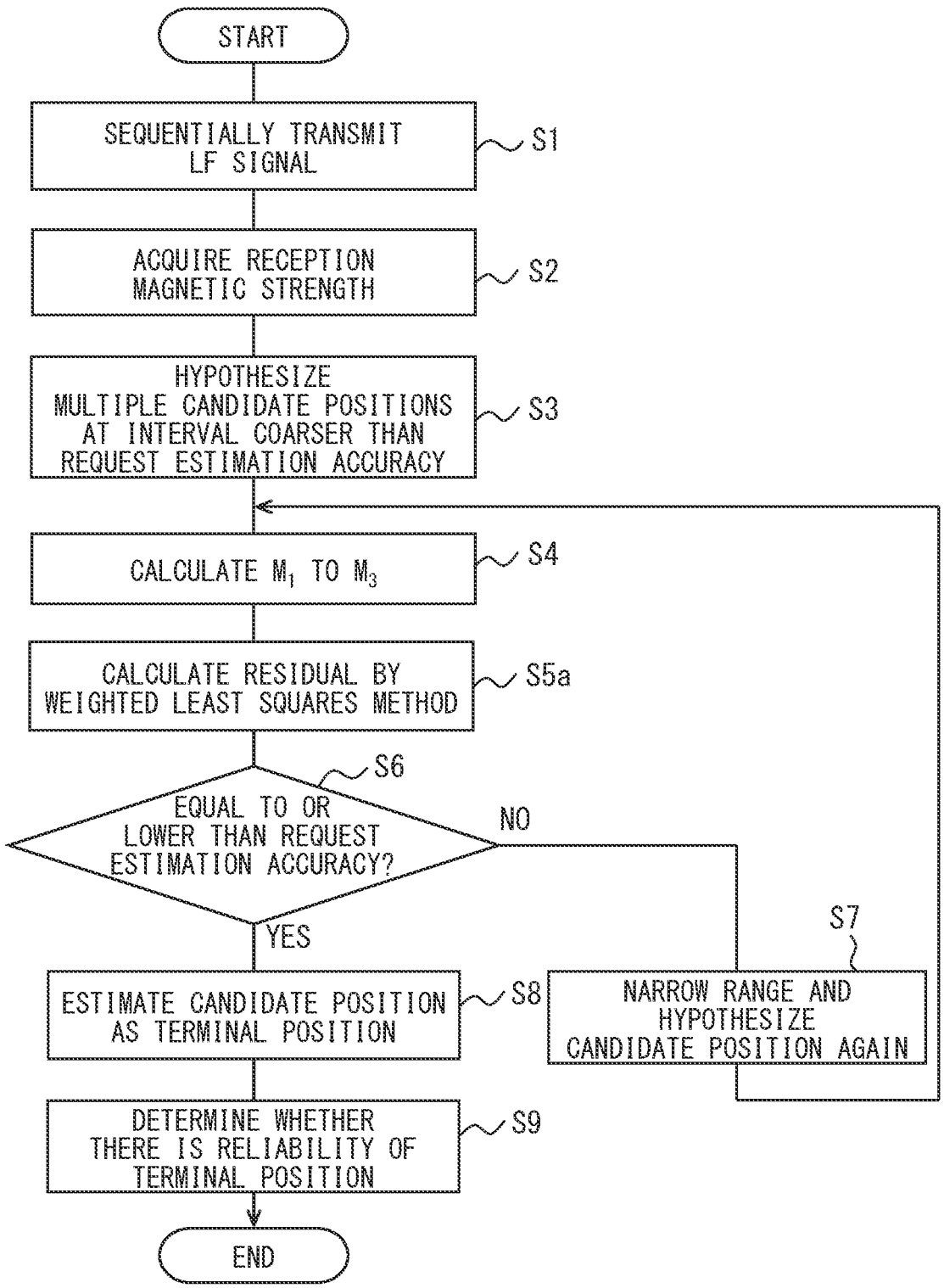
FIG. 8 is a flowchart showing one example of the flow of the position estimation related process in the vehicle control device according to a second embodiment.

In the second embodiment, the position estimation related process in the vehicle control device 30 will be described with reference to a flowchart of FIG. 8. The flowchart of FIG. 8 is the similar to the position estimation related process of the first embodiment except that the process of S5a is executed instead of the process of S5. In S5a, the terminal position estimation portion 303 calculates the residual by, for example, the weighted least squares method as shown in the equation 10 based on the errors $M_1$ to $M_3$ calculated in S4 for each LF transmission antenna 31.

Third Embodiment

In the first embodiment, the configuration in which as the initial candidate positions, multiple candidate positions at intervals coarser than the request estimation accuracy of the terminal position are hypothesized has been shown. In a third embodiment, as the initial candidate position, the multiple candidate positions may be hypothesized by narrowing down to the periphery of the terminal position roughly specified by using the Newton method.

After the circular approximation of the magnetic field strength distribution for each LF transmission antenna 31 is performed, the terminal position estimation portion 303 calculates the distance between each LF transmission antenna 31 and the communication terminal 2 based on the reception magnetic field strength acquired by the response acquisition portion 302 for each LF transmission antenna 31. Here, the distance between each LF transmission antenna 31 and the communication terminal 2 may be calculated by referring to the relationship that the magnetic field strength distribution of the LF transmission antenna 31 is inversely proportional to the cube of the distance from the LF transmission antenna 31. The terminal position that most satisfies the calculated distance may be specified by the Newton method, and the multiple candidate positions may be hypothesized by narrowing down to the periphery of the specified terminal position.

The specified position periphery may be the vicinity of the specified terminal position, and may be a range narrower than a range in which the multiple initial candidate positions are hypothesized in the first embodiment. In addition, it is preferable that the interval at which the multiple candidate positions are hypothesized is coarser than the request estimation accuracy of the terminal position.

It may be possible to reduce the calculation load of the terminal position estimation portion 303 by narrowing down to the periphery of the terminal position roughly specified by using the Newton method and hypothesizing the multiple candidate positions. After the multiple candidate positions can be hypothesized by narrowing down to the periphery of the terminal position roughly specified by using the Newton method, it is preferable to more accurately estimate the position of the communication terminal by repeating a process of selecting the candidate position having the minimum residual described above, further narrowing the interval of the selected candidate position down to the selected candidate position periphery, hypothesizing the multiple candidate positions again, and selecting the candidate position having the minimum residual.

Figure 9:
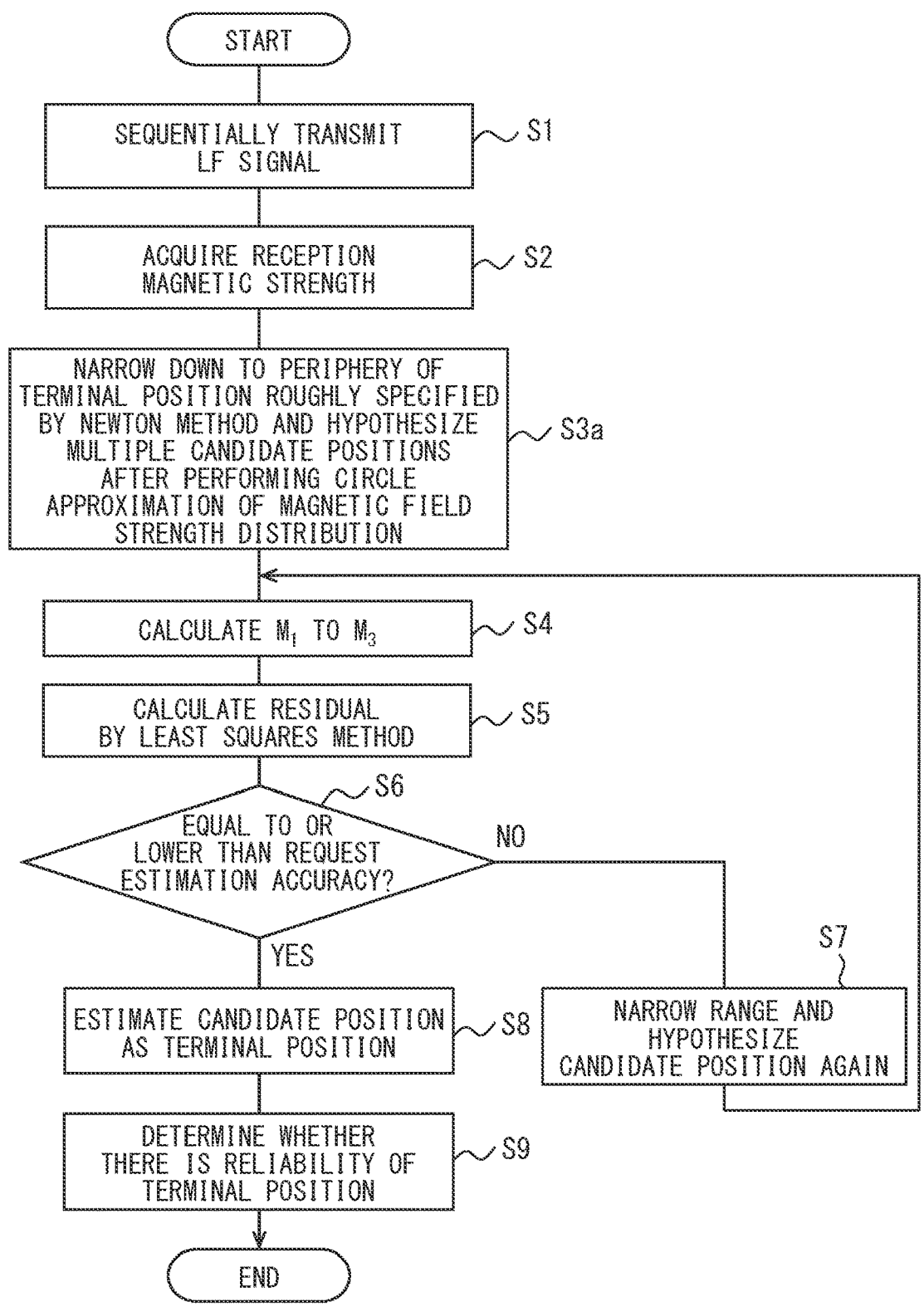
FIG. 9 is a flowchart showing one example of the flow of the position estimation related process in the vehicle control device according to a third embodiment.

The position estimation related process in the vehicle control device 30 will be described with reference to a flowchart of FIG. 9. The flowchart of FIG. 9 is the similar to the position estimation related process of the first embodiment except that the process of S3a is executed instead of the process of S3. In S3a, after the circle approximation of the magnetic field strength distribution is performed, the terminal position estimation portion 303 hypothesizes the multiple candidate positions by narrowing down to the periphery of the terminal position roughly specified by using the Newton method.

Fourth Embodiment

In the first embodiment, the configuration in which as the initial candidate positions, multiple candidate positions at the interval coarser than the request estimation accuracy of the terminal position are hypothesized has been shown. In a fourth embodiment, as the initial candidate position, the multiple candidate positions may be hypothesized by narrowing down to the periphery of the terminal position estimated in the past.

As one example, the terminal position estimation portion 303 may hypothesize the multiple candidate positions by narrowing down to the terminal position periphery estimated in the latest past. The terminal position periphery estimated in the latest past may be a terminal position vicinity estimated in the latest past, and may be a range narrower than a range in which the multiple initial candidate positions are hypothesized in the first embodiment. In addition, it is preferable that the interval at which the multiple candidate positions are hypothesized is coarser than the request estimation accuracy of the terminal position. When the terminal position estimated in the past does not exist, the terminal position may be estimated in the similar manner to the first and third embodiments.

It may be possible to reduce the calculation load of the terminal position estimation portion 303 by narrowing down to the periphery of the terminal position estimated in the past and hypothesizing the multiple candidate positions. After the multiple candidate positions can be hypothesized by narrowing down to the periphery of the terminal position estimated in the past, it is preferable to more accurately estimate the position of the communication terminal by repeating a process of selecting the candidate position having the minimum residual described above, further narrowing the interval of the selected candidate position down ti the selected candidate position periphery, hypothesizing the multiple candidate positions again, and selecting the candidate position having the minimum residual.

Figure 10:
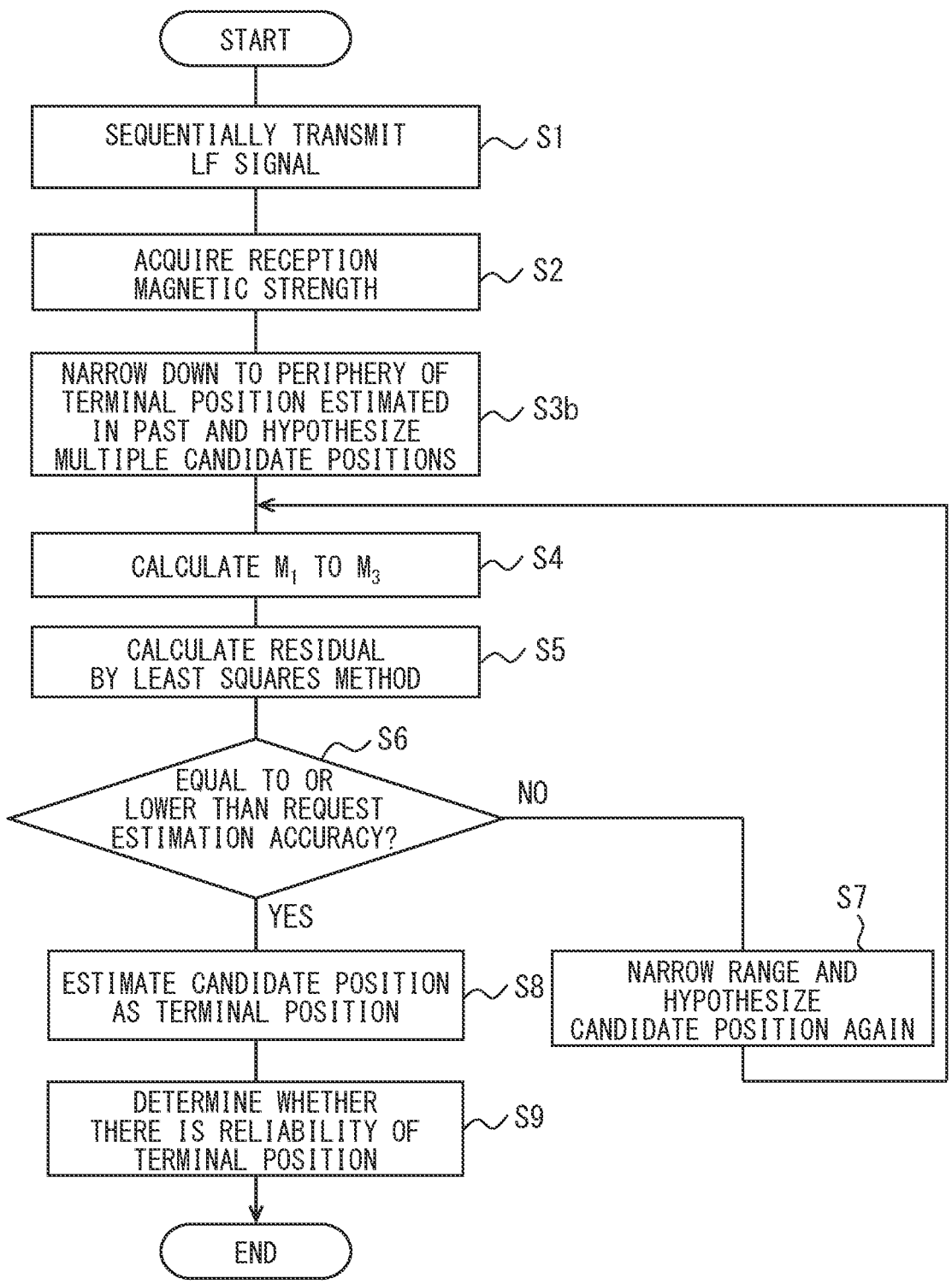
FIG. 10 is a flowchart showing one example of the flow of the position estimation related process in the vehicle control device according to a fourth embodiment.

The position estimation related process in the vehicle control device 30 will be described with reference to a flowchart of FIG. 10. The flowchart of FIG. 10 is the similar to the position estimation related process of the first embodiment except that a process of S3b is executed instead of the process of S3. In S3b, the terminal position estimation portion 303 hypothesizes the multiple candidate positions by narrowing down to the terminal position periphery estimated in the past.

Fifth Embodiment

In a first embodiment, the estimation of the terminal position is performed on the vehicle side. However, it is not limited to this. In the fifth embodiment, for example, the estimation of the terminal position may be performed on the communication terminal side. A configuration of the fifth embodiment will be described below. The terminal position estimation system 1 of the fifth embodiment includes a communication terminal 2a carried by the user and a vehicle unit 3a used in the vehicle.

Figure 11:
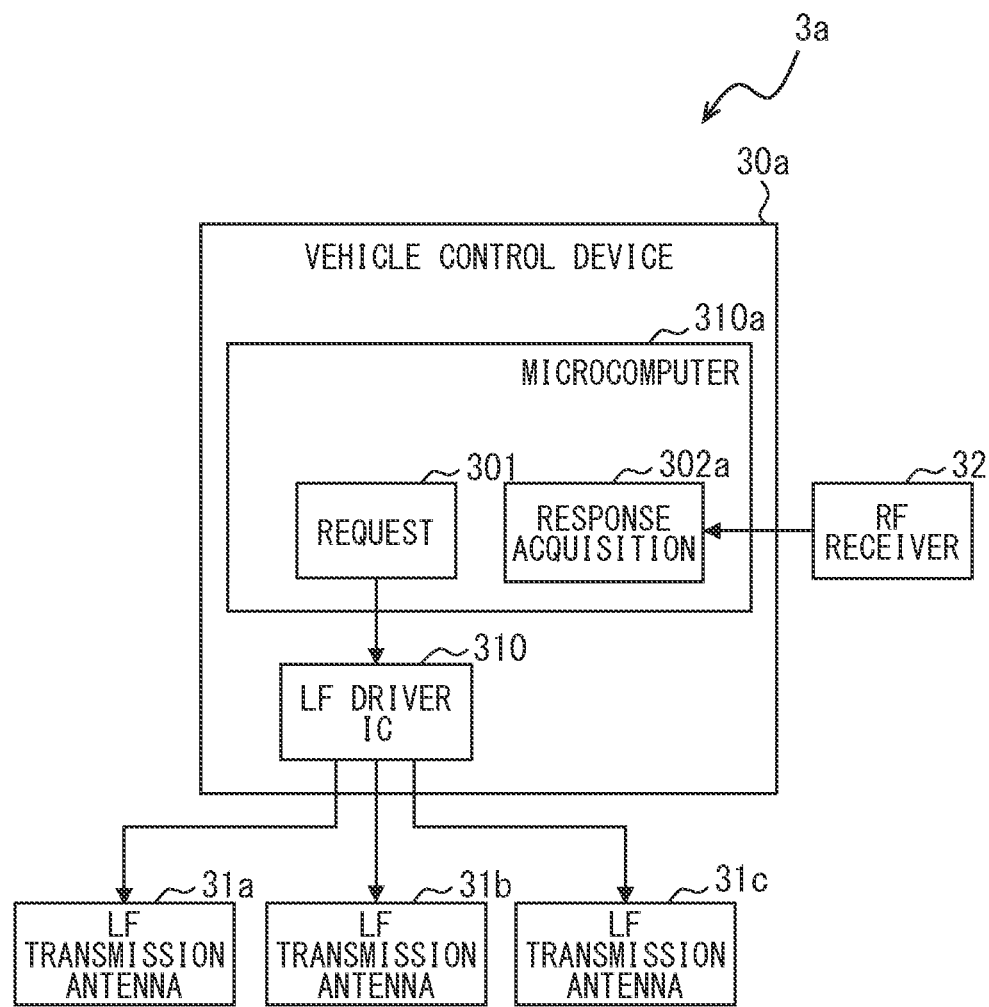
FIG. 11 is a diagram showing one example of a schematic configuration of a vehicle unit.

The vehicle unit 3a will be described with reference to FIG. 11. As shown in FIG. 11, the vehicle unit 3a includes a vehicle control device 30a, the LF transmission antennas 31a to 31c, and the RF receiver 32. The vehicle unit 3a is the similar to the vehicle unit 3 of the first embodiment except that the vehicle unit 3a includes the vehicle control device 30a instead of the vehicle control device 30.

As shown in FIG. 11, the vehicle control device 30a includes a microcomputer 300a and a LF driver IC 310a. The vehicle control device 30a is the similar to the vehicle control device 30 of the first embodiment except that the vehicle control device 30a includes the microcomputer 300a and the LF driver IC 310a instead of the microcomputer 300 and the LF driver IC 310.

As shown in FIG. 11, the microcomputer 300a includes the request portion 301 and the response acquisition portion 302a as the functional blocks. As shown in FIG. 11, the microcomputer 300a includes the request portion 301 and the response acquisition portion 302a as the functional blocks. The microcomputer 300a is the similar to the microcomputer 300 of the first embodiment except that the microcomputer 300a does not include the terminal position estimation portion 303 and the reliability determination portion 304 and includes the response acquisition portion 302a instead of the response acquisition portion 302.

The response acquisition portion 302a acquires the response signal that is received by the RF receiver 32 from the communication terminal 2a and includes the terminal position estimated by the communication terminal 2a. This response acquisition portion 302a corresponds to the strength acquisition portion.

In the vehicle control device 30a, for example, when the response signal includes an authentication code, authentication is performed by using this code. Depending on the position of the communication terminal 2 acquired by the response acquisition portion 302a and whether the authentication is established, a door may be locked or unlocked, the start of the traveling drive source of the vehicle may be permitted, or the like.

The LF driver IC 310a is the similar to the LF driver IC 310 of the first embodiment except that a part of processes is different. When the LF signal is transmitted in order from the LF transmission antennas 31a to 31c, the LF driver IC 310a transmits this LF signal including the position of each LF transmission antenna 31.

Figure 12:
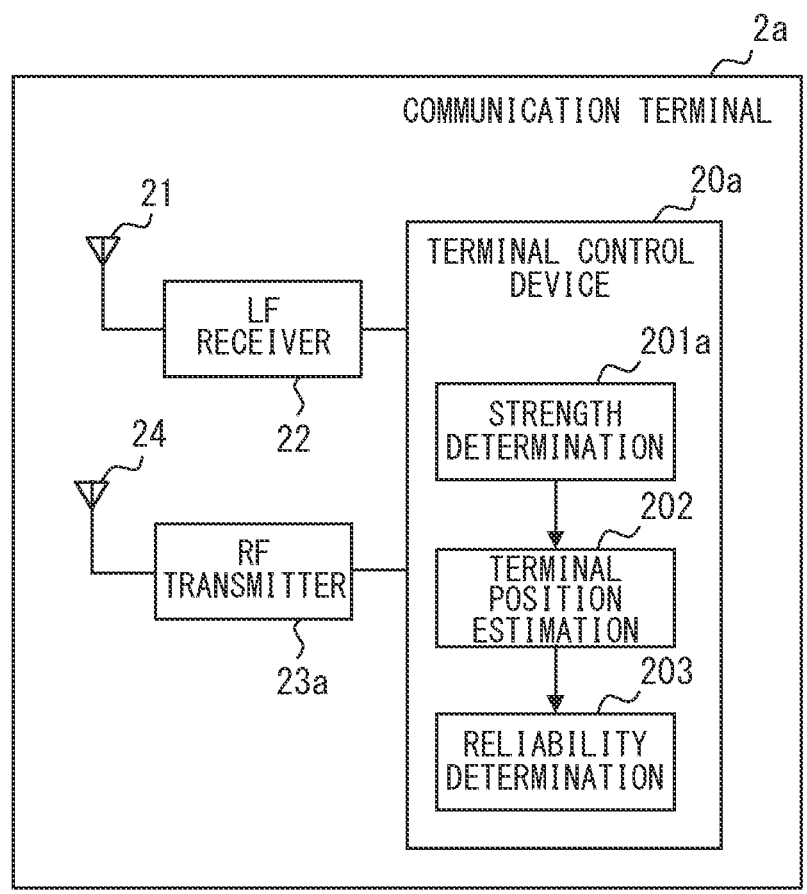
FIG. 12 is a diagram showing a schematic configuration of a communication terminal.

The communication terminal 2a will be described with reference to FIG. 12. As shown in FIG. 12, the communication terminal 2a includes a terminal control device 20a, the LF reception antenna 21, the LF reception portion 22, a RF transmission portion 23a, and the RF transmission antenna 24. The communication terminal 2a is the similar to the communication terminal 2 of the first embodiment except that the communication terminal 2a includes the terminal control device 20a and the RF transmission portion 23a instead of the terminal control device 20 and the RF transmission portion 23.

The terminal control device 20a is the computer, or the like, and includes a strength determination portion 201a, a terminal position estimation portion 202, and a reliability determination portion 203. This terminal control device 20a also corresponds to the terminal position estimation apparatus. The terminal control device 20a is the similar to the terminal control device 20 of the first embodiment except that the terminal control device 20a includes the strength determination portion 201a instead of the strength determination portion 201 and includes the terminal position estimation portion 202 and the reliability determination portion 203. The terminal control device 20a includes the processor, the memory, the I/O, and the bus connecting these, and executes various processes such as a program related to the position estimation of the communication terminal 2 by executing a control program stored in the memory. Execution of this control program by the processor corresponds to execution of the method corresponding to the control program. This method corresponds to the terminal position estimation method. The memory is the non-transitory tangible storage medium that non-temporarily stores the computer readable program and data. The non-transitory tangible storage medium is realized by a semiconductor memory, a magnetic disc, or the like.

Similarly to the strength determination portion 201 of the first embodiment, the strength determination portion 201a acquires the reception magnetic field strength of the electric wave transmitted from each LF transmission antenna 31 by determining the reception magnetic field strength. The terminal position estimation portion 202 estimates the position of the communication terminal 2 by using the reception magnetic field strength for each LF transmission antenna 31 and the position of the LF transmission antenna 31, the reception magnetic field strength being acquired by the strength determination portion 201a, the position being included in the LF signal received by the LF reception portion 22 for each LF transmission antenna 31. The terminal position estimation portion 202 may execute the estimation process of the terminal position in the similar manner to the terminal position estimation portion 303 of the first embodiment.

When generating the original signal of the response signal in accordance with the reception signal input from the LF reception portion 22, the terminal control device 20a generates the original signal of the response signal including the terminal position estimated by the terminal position estimation portion 202, and outputs this original signal to the RF transmission portion 23. The RF transmission portion 23 transmits the response signal including the terminal position.

The reliability determination portion 203 determines whether there is the reliability of the terminal position sequentially estimated by the terminal position estimation portion 202. The reliability determination portion 203 may estimate that there is reliability of the terminal position in the similar manner to the reliability determination portion 304 of the first embodiment. The response signal including whether there is the reliability of the terminal position determined by the reliability determination portion 203 may be transmitted.

The configuration of the fifth embodiment may employ the configuration in which the terminal position is estimated on the communication terminal side instead of the vehicle side. Even when such a configuration is employed, it may be possible to similarly obtain the effect of further improving the accuracy of the position of the communication terminal 2a estimated based on the electric wave received by the communication terminal 2a from the multiple LF transmission antennas 31.

The configuration is not limited to the configuration in which the terminal position estimated by the communication terminal 2a is transmitted to the vehicle unit 3a, and may be a configuration in which the communication terminal 2a executes the process in accordance with the terminal position estimated by the communication terminal 2a. For example, the communication terminal 2a may perform notification showing the terminal position. In this case, the terminal position determined by the reliability determination portion 203 to have no reliability may not be used for the downstream process, or the latest past terminal position determined to have the reliability may be used for the downstream process.

Sixth Embodiment

In the embodiments described above, the reliability determination portion 203 and the reliability determination portion 304 determine whether there is the reliability of the terminal position. However, it is not limited to this. For example, the terminal position estimation system 1 may not include the reliability determination portion 203 and the reliability determination portion 304. It may not be determined whether there is the reliability of the terminal position.

Seventh Embodiment

In the embodiments described above, it has been described that the example of the electric wave used for the estimation of the terminal position is the LF. However, it is not limited to this. For example, an electric wave other than the LF may be used.

Eighth Embodiment

In the embodiment described above, the example of the case where the terminal position estimation system 1 is applied to the estimation of the terminal position with respect to the vehicle has been described. However, it is not limited to this. For example, the terminal position estimation system 1 may be applied to estimation of the terminal position in the interior, or may be applied to estimation of the terminal position in the exterior. When the terminal position estimation system 1 is applied to the estimation of the terminal position in the interior, multiple transmission antennas transmitting the electric wave used for the terminal position estimation may be, for example, placed in the interior. The positions of the transmission antennas may be positions with respect to a reference point of this interior. When the terminal position estimation system 1 is applied to the estimation of the terminal position in the exterior, the multiple transmission antennas transmitting the electric wave used for the terminal position estimation may be, for example, placed in the exterior. The positions of the transmission antennas may be positions with respect to a reference point of this exterior.

It is noted that a flowchart or the process of the flowchart in the present disclosure includes multiple steps (also referred to as sections), each of which is represented, for instance, as S1. Further, each step can be divided into several sub-steps while several steps can be combined into a single step.

The control and the method therefor which have been described in the present disclosure may be also implemented by a dedicated computer which constitutes a processor programmed to execute one or more functions concretized by computer programs. Alternatively, the controller and the method described in the present disclosure may be implemented by a special purpose computer configured as a processor with a special purpose hardware logic circuits. Alternatively, the controller and the method described in the present disclosure may be implemented by one or more dedicated computers configured by a combination of a processor executing a computer program and one or more hardware logic circuits. Further, the computer program may be stored in a computer-readable non-transition tangible recording medium as an instruction executed by a computer.

While various embodiments, configurations, and aspects of the terminal position estimation system, the terminal position estimation apparatus, the terminal position estimation method, and the control program according to one aspect of the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

The invention claimed is:

1. A terminal position estimation system comprising:
a plurality of transmission antennas that are predetermined;
a reception antenna of a communication terminal configured to receive an electric wave transmitted from the plurality of transmission antennas;
a strength determination portion configured to determine a magnetic field strength of the electric wave received by the reception antenna; and
a terminal position estimation portion configured to estimate a communication terminal position based on the magnetic field strength of the electric wave transmitted from the plurality of transmission antennas, the magnetic field strength being determined by the strength determination portion,
wherein:
when estimating the communication terminal position based on the magnetic field strength of the electric wave transmitted from the plurality of transmission antennas, the terminal position estimation portion estimates, as the communication terminal position, a position satisfying an approximate expression for each of the plurality of transmission antennas within a predetermined range;
the approximate expression shows a magnetic field strength distribution for each of the plurality of transmission antennas and is expressed by two variables of a distance from the plurality of transmission antennas to the communication terminal and an angle between an axial direction of the plurality of transmission antennas and a direction in which the communication terminal is positioned; and
the terminal position estimation portion is configured to hypothesize a plurality of candidate positions of the communication terminal, and estimate, as the communication terminal position, a candidate position with a minimum residual among a plurality of residuals between the magnetic field strength obtained when a candidate position among the plurality of candidate positions is plugged into the approximate expression for each of the plurality of transmission antennas and the magnetic field strength determined by the strength determination portion.

2. The terminal position estimation system according to claim 1, wherein:
at least one transmission antenna among the plurality of transmission antennas is placed in a direction intersecting with an axial direction of a transmission antenna different from the at least one transmission antenna.

3. The terminal position estimation system according to claim 1, wherein:
the terminal position estimation portion is configured to estimate the communication terminal position by repeating a process of
hypothesizing the plurality of candidate positions of the communication terminal at an interval coarser than a request estimation accuracy of the communication terminal position,
selecting the candidate position with the minimum residual,
further narrowing the interval down to a periphery of a selected candidate position,
hypothesizing the plurality of candidate positions again, and
selecting the candidate position with the minimum residual.

4. The terminal position estimation system according to claim 1, wherein:
the terminal position estimation portion estimates the communication terminal position by repeating a process,
after performing circle approximation of the magnetic field strength distribution for each of the plurality of transmission antennas, calculating a distance between each of the plurality of transmission antennas and the communication terminal based on the magnetic field strength determined by the strength determination portion for each of the plurality of transmission antennas,
specifying the communication terminal position most satisfying the distance by a Newton method,
narrowing down to a periphery of a specified position,
hypothesizing the plurality of candidate positions of the communication terminal,
selecting the candidate position with the minimum residual,
further narrowing the interval down to the periphery of a selected candidate position, hypothesizing the plurality of candidate positions again, and selecting the candidate position with the minimum residual.

5. The terminal estimation system according to claim 1, wherein:

the residual is a value obtained by adding a squared value of an error between the magnetic field strength obtained by using each of the plurality of candidate positions in the approximate expression for each of the plurality of transmission antennas and the magnetic field strength determined by the strength determination portion.

6. The terminal position estimation system according to claim 1, wherein:

the residual is a value obtained by adding a value obtained by multiplying, by a coefficient in accordance with the magnetic field strength determined by the strength determination portion for each of the plurality of transmission antennas, a squared value of an error between the magnetic field strength obtained by using each of the plurality of candidate positions in the approximate expression for each of the plurality of transmission antennas and the magnetic field strength determined by the strength determination portion.

7. The terminal position estimation system according to claim 1, wherein:

the terminal position estimation portion is configured to sequentially estimate the communication terminal position; and the terminal position estimation portion is configured to estimate the communication terminal position by repeating a process of
narrowing down to a periphery of the communication terminal position estimated in a past,
hypothesizing the plurality of candidate positions of the communication terminal,
selecting the candidate position with the minimum residual,
further narrowing an interval down to a periphery of a selected candidate position,
hypothesizing the plurality of candidate positions again, and
selecting the candidate position with the minimum residual.

8. A terminal position estimation system comprising:

a plurality of transmission antennas that are predetermined;

a reception antenna of a communication terminal configured to receive an electric wave transmitted from the plurality of transmission antennas;

a strength determination portion configured to determine a magnetic field strength of the electric wave received by the reception antenna; and a terminal position estimation portion configured to estimate a communication terminal position based on the magnetic field strength of the electric wave transmitted from the plurality of transmission antennas, the magnetic field strength being determined by the strength determination portion, wherein:

when estimating the communication terminal position based on the magnetic field strength of the electric wave transmitted from the plurality of transmission antennas, the terminal position estimation portion estimates, as the communication terminal position, a position satisfying an approximate expression for each of the plurality of transmission antennas within a predetermined range;

the approximate expression shows a magnetic field strength distribution for each of the plurality of transmission antennas and is expressed b two variables of a distance from the plurality of transmission antennas to the communication terminal and an angle between an axial direction of the plurality of transmission antennas and a direction in which the communication terminal is positioned;

the terminal position estimation portion is configured to sequentially estimate the communication terminal position; and the terminal position estimation system includes a reliability determination portion configured to determine whether an estimated communication terminal position has reliability based on whether a movement distance of the communication terminal position sequentially estimated by the terminal position estimation portion from a position estimated in a past per unit time is equal to or lower than a predetermined distance.

9. A terminal position estimation apparatus, comprising:

a strength acquisition portion configured to acquire a magnetic field strength of an electric wave that is received by a reception antenna of a communication terminal and is transmitted from a plurality of transmission antennas that are predetermined; and a terminal position estimation portion configured to estimate a communication terminal position based on the magnetic field strength of the electric wave transmitted from the plurality of transmission antennas, the magnetic field strength being acquired by the strength acquisition portion, wherein:

when estimating the communication terminal position based on the magnetic field strength of the electric wave transmitted from the plurality of transmission antennas, the terminal position estimation portion estimates, as the communication terminal position, a position satisfying an approximate expression for each of the plurality of transmission antennas within a predetermined range;

the approximate expression shows a magnetic field strength distribution for each of the plurality of transmission antennas and is expressed by two variables of a distance from the plurality of transmission antennas to the communication terminal and an angle between an axial direction of the plurality of transmission antennas and a direction in which the communication terminal is positioned; and the terminal position estimation portion is configured to hypothesize a plurality of candidate positions of the communication terminal, and estimate, as the communication terminal position, a candidate position with a minimum residual among a plurality of residuals between the magnetic field strength obtained when a candidate position among the plurality of candidate positions is plugged into the approximate expression for each of the plurality of transmission antennas and the magnetic field strength determined by the strength acquisition portion.

10. A terminal position estimation method, comprising:

receiving, by a reception antenna of a communication terminal, an electric wave transmitted from a plurality of transmission antennas that are predetermined;

determining that a magnetic field strength of the electric wave received by the reception antenna;

estimating, as a communication terminal position, a position satisfying an approximate expression for each of the plurality of transmission antennas within a predetermined range when estimating the communication terminal position based on a determined magnetic field strength of the electric wave transmitted from the plurality of transmission antennas, the approximate expression showing a magnetic field strength distribution for each of the plurality of transmission antennas and is expressed by two variables of a distance from the plurality of transmission antennas to the communication terminal and an angle between an axial direction of the plurality of transmission antennas and a direction in which the communication terminal is positioned; and hypothesizing a plurality of candidate positions of the communication terminal, and estimating, as the communication terminal position, a candidate position with a minimum residual among a plurality of residuals between the magnetic field strength obtained when a candidate position among the plurality of candidate positions is plugged into the approximate expression for each of the plurality of transmission antennas and the magnetic field strength.

11. A computer-readable non-transitory tangible storage medium storing a control program configured to cause a computer to:

acquire a magnetic field strength of an electric wave that is received by a reception antenna of a communication terminal and is transmitted from a plurality of transmission antennas that are predetermined;

estimate, as a communication terminal position, a position satisfying an approximate expression for each of the plurality of transmission antennas within a predetermined range when estimating the communication terminal position based on the magnetic field strength of the electric wave transmitted from the plurality of transmission antennas, the approximate expression showing a magnetic field strength distribution for each of the plurality of transmission antennas and being expressed by two variables of a distance from the plurality of transmission antennas to the communication terminal and an angle between an axial direction of the plurality of transmission antennas and a direction in which the communication terminal is positioned; and hypothesize a plurality of candidate positions of the communication terminal, and estimate, as the communication terminal position, a candidate position with a minimum residual among a plurality of residuals between the magnetic field strength obtained when a candidate position among the plurality of candidate positions is plugged into the approximate expression for each of the plurality of transmission antennas and the magnetic field strength.

\* \* \* \* \*